United States Patent [19]
de Jong et al.

[11] Patent Number: 5,400,426
[45] Date of Patent: Mar. 21, 1995

[54] FIBER OPTIC MECHANICAL SPLICE HAVING GROOVES FOR DISSIPATING INDEX MATCHING MATERIAL IMPURITIES

[75] Inventors: Michael de Jong, Fort Worth, Tex.; Rodney A. Throckmorton, Conover; Dennis M. Knecht, Hickory, both of N.C.

[73] Assignee: Siecor Corporation, Hickory, N.C.

[21] Appl. No.: 108,970

[22] Filed: Aug. 19, 1993

[51] Int. Cl.⁶ .................................. G02B 6/38
[52] U.S. Cl. ............................ 385/95; 385/97; 385/98; 385/99
[58] Field of Search .............. 385/95, 70, 75, 97, 385/98, 99, 65, 80, 83

[56] References Cited

U.S. PATENT DOCUMENTS

| | | | |
|---|---|---|---|
| 3,768,146 | 10/1973 | Braun et al. | 385/99 X |
| 4,079,927 | 3/1978 | Rocton | 269/296 |
| 4,109,369 | 8/1978 | Taylor | 385/98 X |
| 4,146,301 | 3/1979 | Cherin et al. | 359/59 X |
| 4,585,304 | 4/1986 | Winter et al. | 385/99 X |
| 4,662,962 | 5/1987 | Malavieille | 385/98 X |
| 4,678,272 | 7/1987 | Finn et al. | 385/99 |
| 4,854,661 | 8/1989 | Cooper et al. | 385/99 X |
| 4,867,525 | 9/1989 | Di Marco et al. | 385/66 X |
| 5,018,821 | 5/1991 | Kurata | 385/95 |
| 5,042,902 | 8/1991 | Huebscher et al. | 385/95 X |
| 5,061,034 | 10/1991 | Fujikawa et al. | 385/95 |
| 5,141,545 | 8/1992 | Grigsby | 385/99 |
| 5,305,409 | 4/1994 | Fujikawa et al. | 385/95 |
| 5,351,331 | 9/1994 | Chun et al. | 385/97 |

OTHER PUBLICATIONS

"Erratic Loss and Reflectance Behavior in Mechanical Splices due to Particulate Occlusion;" 1990 National Fiber Optic Engineers Conference 4/1990).

"A New Quick Field Installable Single Mode Optical Fiber Connector" NEC Res. & Develop. vol. 32, No. 1, pp. 61–68 1/1991).

Primary Examiner—Brian Healy
Attorney, Agent, or Firm—J. David Abernethy

[57] ABSTRACT

Disclosed is a fiber optic mechanical splice having one or more grooves transverse to the groove in which the optical fibers lie to dissipate air trapped in index matching material from the junction point of the optical fibers.

7 Claims, 2 Drawing Sheets

FIBER OPTIC MECHANICAL SPLICE HAVING GROOVES FOR DISSIPATING INDEX MATCHING MATERIAL IMPURITIES

BACKGROUND OF THE INVENTION

Optical couplers, such as connectors and splices, are a vital part of the total fiber optic communications network. These devices help determine whether the fiber optics loop will have sufficient cost efficiency and technical efficiency to become more widely used by subscribers.

Optical fibers may be joined to each other by either fusion or mechanical splices. Mechanical splices are defined as those splices which are not fusion splices. An index matching material such as a grease or gel is used in many splices to minimize Fresnel losses.

The technical literature has addressed concerns that fiber optic mechanical splices may experience erratic losses and reflectance due to particulate occlusion. Such occlusion occurs when air bubbles or dust particles become trapped around the junction point between optical fibers in a mechanical splice. Since air bubbles in the index matching material used in mechanical splices are undesirable, it has been suggested to subject such materials to a vacuum after mixing, and to use high viscosity materials as components of index matching materials.

Because index matching materials are imperfect, it is believed that a need exists for fiber optic mechanical splices designed to ameliorate the problem of air bubbles in index matching materials.

SUMMARY OF THE INVENTION

The fiber optic mechanical splice according to the invention contains means for dissipation of air bubbles in index matching materials. Two optical fibers lie end to end in a V-groove in an elongate support member. A lid covers the support member. The junction point of the two optical fibers lies between grooves transverse to the V-groove in which the optical fibers lie, which transverse grooves may be made in the surface of the support member or the lid (or one transverse groove each in the support member and lid). The two optical fibers are spliced together at the junction point, and means such as a housing with slots therein serve to urge the lid and support member toward each other. The transverse grooves are in communication with the V-groove in which the optical fibers lie. An index matching material surrounds the junction point of the two optical fibers.

BRIEF DESCRIPTION OF THE DRAWINGS

The detailed description of the preferred embodiments is made with the aid of the drawings, in which.

DETAILED DESCRIPTION OF THE INVENTION

Figure 1:
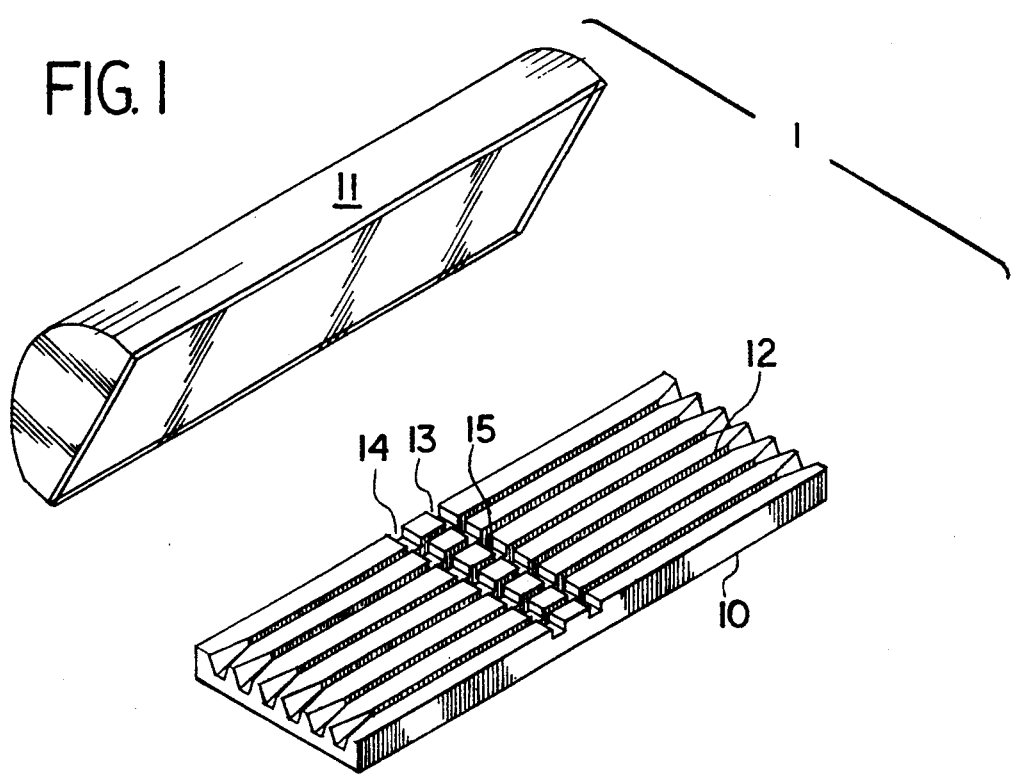
FIG. 1 is a perspective view of the first preferred embodiment.
Figure 4:
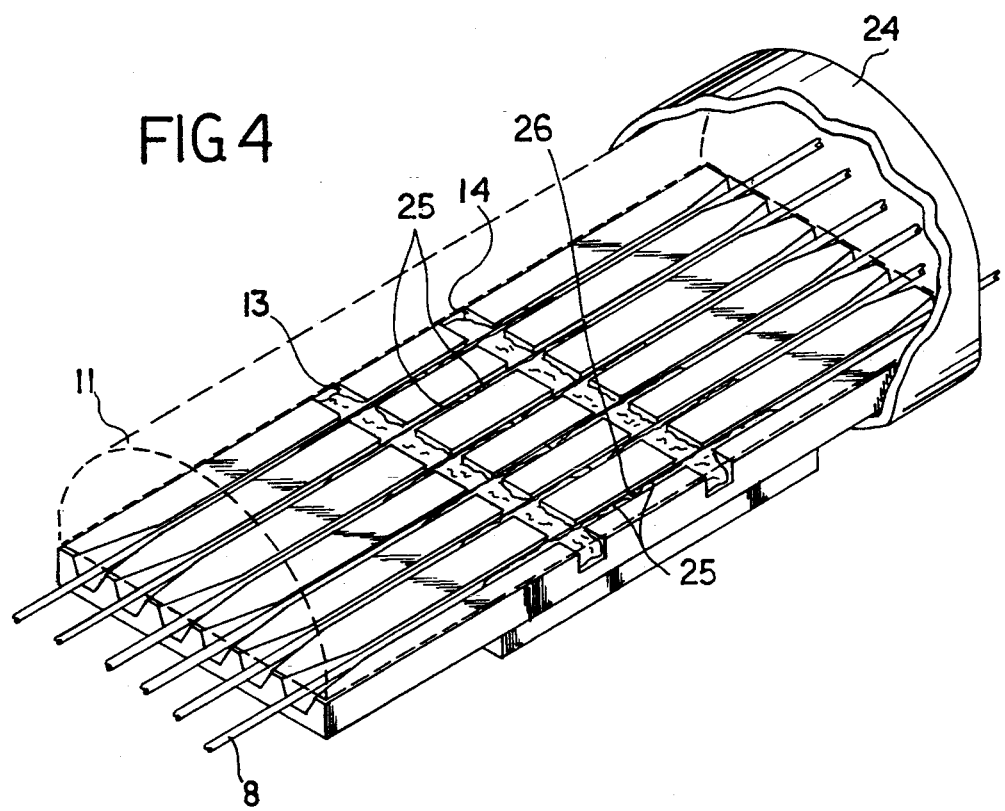
FIG. 4 is a cut away view of an assembled optical splice according to the first embodiment.

As shown in FIG. 1, the first embodiment of the invention includes elongate support member 10 having a set of first grooves 12 and second and third grooves 13, 14 in the surface of elongate support member 10, the second and third groove in communication with and transverse to the set of first grooves such as groove 12. As shown in FIG. 4, optical fibers 8, 9 lie in a first groove 12 and are spliced to each other end to end at junction point 26 but are not fused to each other by melting. Lid 11 covers support member 10 and grooves 12, 13 and 14. An index matching gel 25 surrounds the junction point 26 of optical fibers 8, 9, to reduce Fresnel losses. Second and third grooves 13, 14 serve to dissipate air bubbles which may be present in index matching gel 25. A housing 24, shown as cut away for better understanding of the figure, serves to urge support member 10 and lid 11 toward each other to provide mechanical stability for the splice. It is to be noted that junction point 26 lies in area 15 (see FIG. 1) of a first groove 12 lying between second and third grooves 13, 14. Support member 10 and lid 11 may be plastic articles formed by injection molding.

Figure 2:
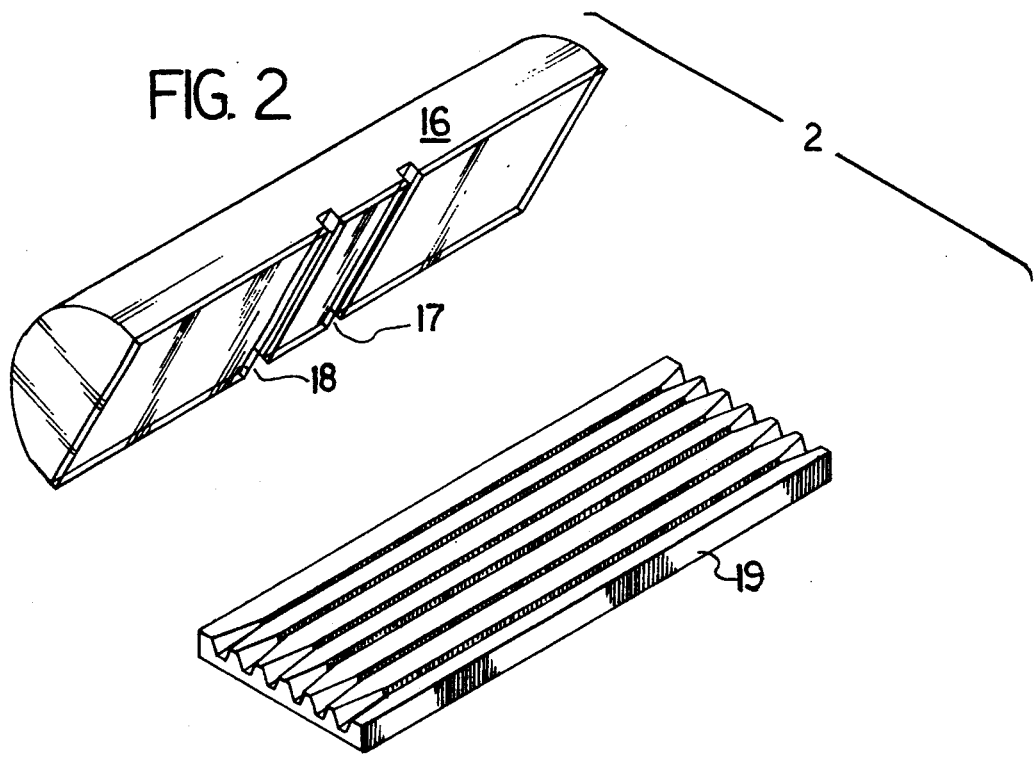
FIG. 2 is a perspective view of the second preferred embodiment.

The second embodiment according to the invention is depicted in FIG. 2, which is the same as the apparatus shown in FIGS. 1, 4 except that second groove 17 and third groove 18 are placed in the surface of lid 16. When the lid is closed, second groove 17 and third groove 18 are adjacent to grooves 12 in elongate support member 19 and serve to dissipate air bubbles which may be found in index matching gel 25 surrounding the junction 26 of two optical fibers 8, 9.

Figure 3:
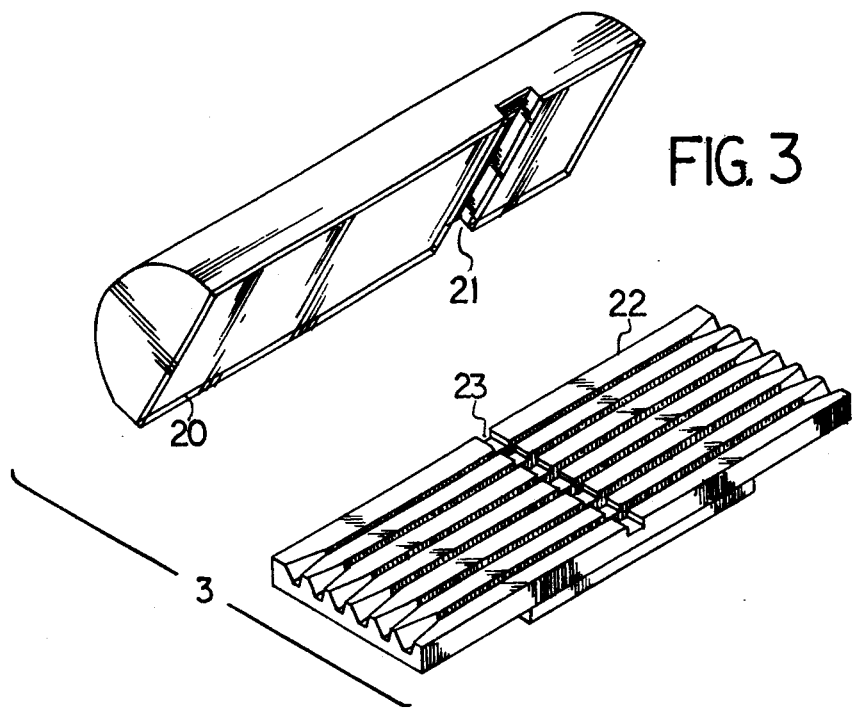
FIG. 3 is a perspective view of the third preferred embodiment.

FIG. 3 shows a third embodiment according to the invention, in which second groove 23 is in the surface of elongate support member 22, but third groove 21 is found in the surface of lid 20. As before, when lid 20 is placed over elongate support member 22, third groove 21 is adjacent to groove 12 in elongate support member 22, and second groove 23 and third groove 21 serve to dissipate air bubbles which may be found in index matching gel 25 surrounding junction 26 of optical fibers 8, 9. Except for the placement of the second and third grooves, the fiber optic mechanical splice embodiments depicted in FIGS. 2 and 3 are the same as that depicted in FIGS. 1 and 4, in which additional details may be seen.

What is claimed is:

1. A fiber optic mechanical splice, comprising an elongate support member having first and second grooves in the surface thereof, but said grooves not extending through the thickness of the support member, the second groove in communication with and transverse to the first groove;

a separate lid covering the support member and the first and second grooves;

first and second optical fibers lying in the first groove between the support member and the lid, said optical fibers spliced to each other end-to-end at a junction point but not fused to each other by melting; and, an index matching material surrounding the junction point of the two optical fibers.

2. A splice as described in claim 1, further comprising a third groove in the surface of the support member, but said third groove not extending through the thickness of the support member, said third groove in communication with and transverse to the first groove, the junction point being between the second and third grooves.

3. A splice as described in claim 1, further comprising a third groove in the surface of the lid, but said third groove not extending through the thickness of the lid, such third groove being transverse to and adjacent to the first groove, the junction point being between the second and third grooves.

4. A splice as described in claim 1, further comprising means for urging the support member and lid toward each other.

5. A fiber optic mechanical splice, comprising:
an elongate support member having a first groove in the surface thereof;
a separate lid covering the support member and the first groove, the lid having a second groove in the surface thereof, but said second groove not extending through the thickness of the lid, the second groove being transverse to and adjacent to the first groove;
first and second optical fibers lying in the first groove between the support member and the lid, said optical fibers spliced end-to-end to each other at a junction point, but not fused to each other by melting; and,
an index matching material surrounding the junction point of the two optical fibers.

6. A splice as described in claim 5, further comprising a third groove in the surface of the lid, but not extending through the, thickness of the lid, the third groove adjacent to and transverse to the first groove, the junction point being between the second and third grooves.

7. A splice as described in claim 6, further comprising means for urging the support member and the lid toward each other.

* * * * *